July 29, 1958 L. SMALL 2,844,957
MOTORIZED HARDNESS TESTER
Filed Feb. 14, 1955 2 Sheets-Sheet 1

INVENTOR.
LOUIS SMALL
BY
SMITH, OLSEN & KOTTS
ATTORNEYS

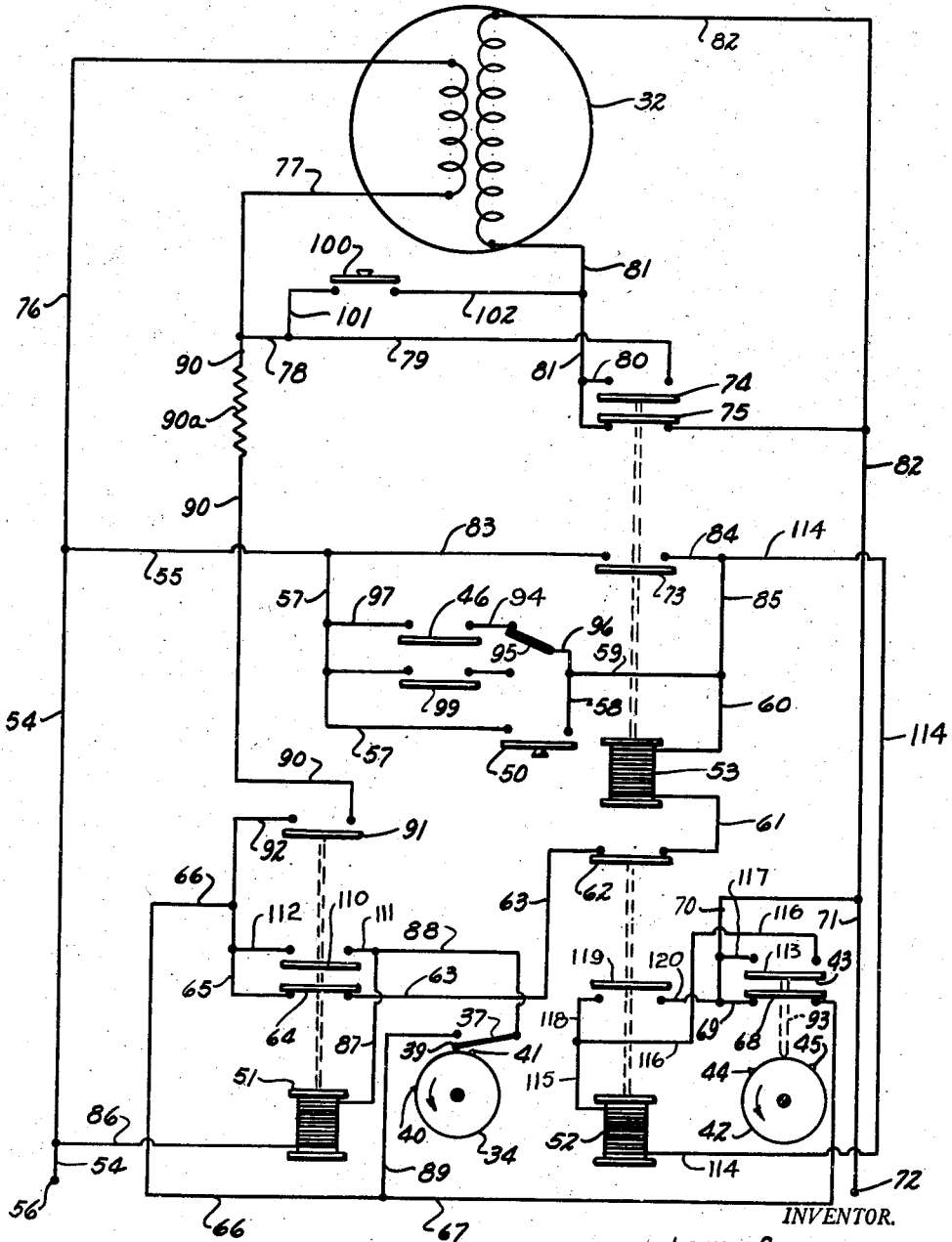

United States Patent Office 2,844,957
Patented July 29, 1958

2,844,957

MOTORIZED HARDNESS TESTER

Louis Small, Detroit, Mich., assignor to Service Diamond Tool, Ferndale, Mich., a company of Michigan Application February 14, 1955, Serial No. 487,767

11 Claims. (Cl. 73—83)

This invention relates to machines for testing the hardness of metals or other solid materials.

Machines of the above-mentioned type generally employ a work-supporting member and a penetrator member. The penetrator member is arranged to be driven into the work by means of one or more weights acting through a weight carrying arm, and means is provided for measuring the amount of penetration into the work. The amount of penetration will of course be a measure of the hardness of the test piece.

In order for the penetration of the penetrator to be an accurate measure of the work piece hardness, it is necessary that each application of the load to the penetrator be conducted under the same conditions. It is desirable for example that the load be applied to the penetrator gradually and with a uniform rate of travel of the load during all hardness measurements. To insure such uniform load application rates (and also to effect speedier measuring operations), there have been devised a number of motorized hardness testing machines. These motorized testing machines generally are so constructed as to effect uniform rates of travel of the weights during each hardness measurement.

One objection to present day motorized testers is that in operating such testers the motors must be kept running during periods when the loads are being applied to the penetrators. Running of the motors at such periods is objectionable in that movements of the motors set up vibrations. These vibrations are transmitted to the weight-carrying arms and constitute a source of error which it is desirable to eliminate.

It is an object of the present invention to provide a motorized hardness tester wherein application of the load to the penetrator is carried out without the occurrence of any undesired vibrations in the weight-carrying member.

It is another object of the present invention to provide a motorized hardness tester wherein application of the load to the penetrator is effected at times when the motor is stopped and incapable of setting up any undesired vibrations in the weight-carrying element.

It is another object of the present invention to provide a motorized hardness tester wherein the load is caused to be applied to the penetrator at the same rate of movement during each hardness measurement and wherein the load-carrying element is out of operative engagement with the motor during the load application period.

Other objects of this invention will appear in the following description and appended claims, reference being had to the accompanying drawings forming a part of this specification wherein like reference characters designate corresponding parts in the several views.

In the drawings:

Figure 2 is a diagrammatic view of an electrical circuit which is employed in the embodiment shown in Figure 1.

Figure 1:
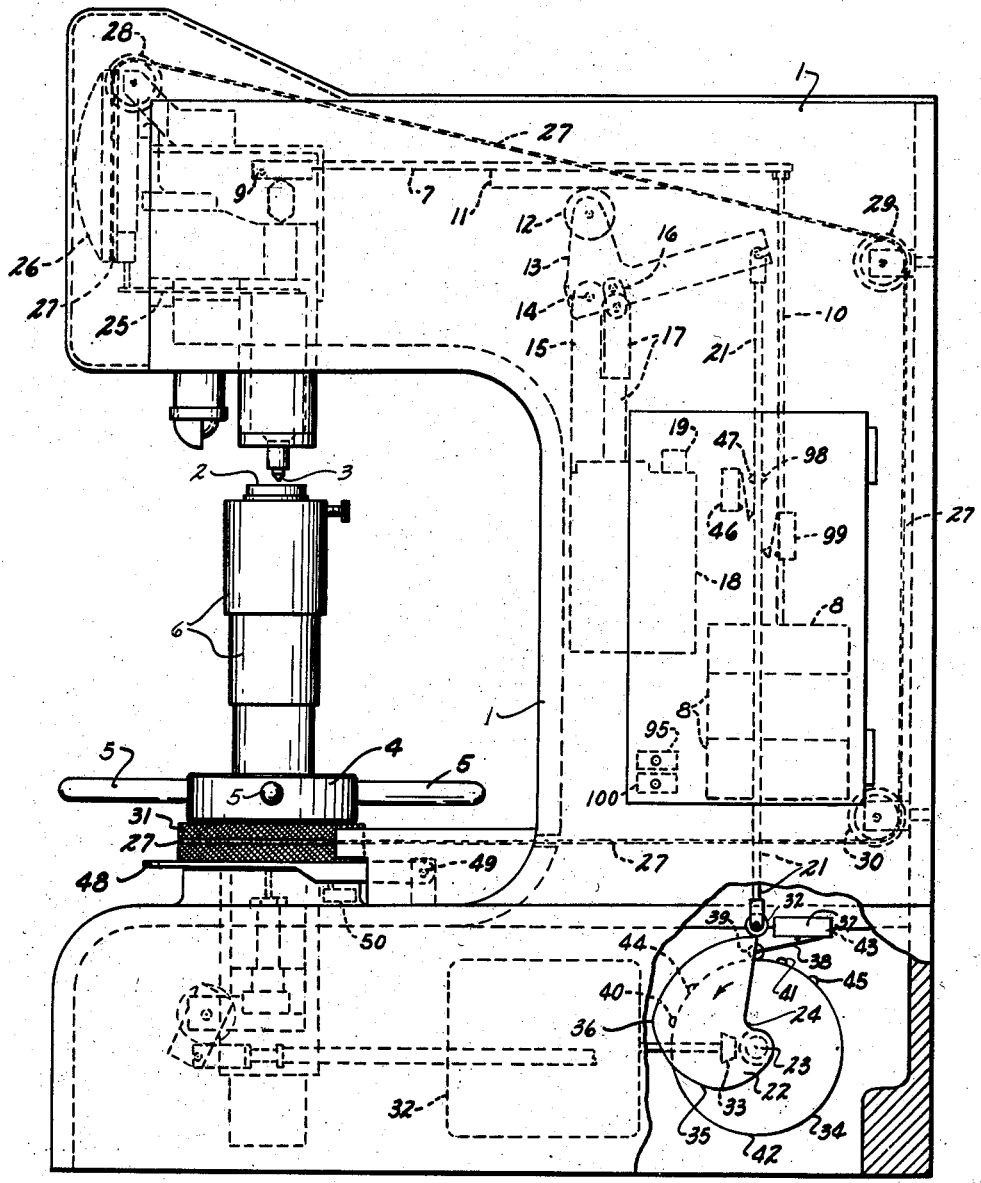
Figure 1 is an end elevational view of one embodiment of the invention.

Before explaining the present invention in detail, it is to be understood that the invention is not limited in its application to the details of construction and arrangement of parts illustrated in the aaccompanying drawings, since the invention is capable of other embodiments and of being practiced or carried out in various ways. Also, it is to be understood that the phraseology or terminology employed herein is for the purpose of description and not of limitation.

Referring to Figure 1, the illustrated embodiment will be seen to include a housing 1 on which are mounted a work-supporting member 2 and a penetrator member 3. Member 2 extends from an elevating screw (not shown) which is in meshing engagement with a lead nut 4. Four handles 5 project from nut 4 to provide for manual actuation of the nut and lead screw. Three telescoping tubes 6 encircle the lead screw to protect it from dust.

Penetrator member 3 is preferably mounted for vertical movement in housing 1 by the mechanism disclosed in Figure 2 of copending application, Serial No. 260,226 filed on December 6, 1951 and now issued as Patent No. 2,726,540 in the name of Louis Small and Michael Antonik. Since this mechanism is adequately described in said copending application a detailed description will not be made here.

In using the instant mechanism the work piece is first mounted on support member 2. Handles 5 are then turned so as to elevate the lead screw and support member 2. Turning movement of the handles is continued until the work piece strikes penetrator member 3 and causes a slight penetration thereof into the work piece. As soon as member 3 is contacted by the work piece it is deflected upwardly so as to move a lever 25. Movement of lever 25 is translated into a deflection of a pointer on the hardness indicator dial 26. When lever 25 has been moved a predetermined amount the turning movement of handles 5 is discontinued. The above described operation constitutes what is commonly termed application of the minor load. The purpose of this operation is merely to correct for surface irregularities in the work piece. The application of the major load (i. e. the load which is designed to give a measure of the work piece hardness) is effected by a mechanism to be described later. Before the major load can be applied, however, it is necessary that the pointer on dial 26 be reset to zero deflection. In the instant embodiment this resetting of the pointer is accomplished by the mechanism of an endless cable 27, a series of six guide pulleys 28, 29 and 30, and a manually actuated drive pulley 31. Cable 27 is trained around the peripheral edge of dial 26, over pulleys 28 (one of which is not visible because it is directly behind the illustrated pulley 28), laterally around pulleys 29, down around pulleys 30, and laterally around drive pulley 31. Manual turning of pulley 31 causes a travel of cable 27 and a rotary movement of the dial 26 casing relative to its pointer. Movement of the dial casing resets the dial pointer at zero deflection.

In order to provide for application of the major load to the penetrator there is provided a series of weights 8. Penetrator member 3 is adapted to be put under the major load by means of a beam or arm 7 which supports the load of weights 8. Arm 7 is pivotally mounted in the housing by means of a pin 9. The free end of arm 7 has attached thereto a rod 10 which carries the weights 8. An intermediate portion of arm 7 has secured thereto a bearing plate 11 which is in bearing engagement with a roller 12. Roller 12 is rotatably mounted on a bell crank 13 which in turn is pivotally mounted at 14 on a fixed support 15. In the illustrated position the axis of roller 12 is positioned slightly to the right of pin 14, and roller 12 is holding arm 7 in such position that the force of weights 8 is not being transmitted to penetrator member 3. Crank 13 is held in its illustrated position by means of a mechanism comprised of a reciprocable rod 21 and rotary cam 22. Rod 21 is guided for straightline motion by two vertically aligned guides (not shown) secured on housing 1. The lower end of rod 21 carries a roller 32 which engages the periphery of cam 22. When cam 22 is moved in a counterclockwise direction about the axis of its shaft 23 rod 21 will gravitate downwardly free of cam 22 into a pocket 24 formed in the cam. Downward movement of rod 21 will cause crank 13 to pivot in a clockwise direction about pin 14 so as to move roller 12 in an arcuate downward direction. Downward arcuate movement of roller 12 allows weights 8 to pull arm 7 downwardly about pivot pin 9. The distance to which arm 7 moves down will, of course, be governed by the hardness of the work piece which is positioned between supporting member 2 and penetrator member 3.

It is desirable for purposes of accuracy in the testing operation that the application of the major load to the penetrator be made slowly and with a uniform rate of fall of the weights. If the weights are allowed to fall too rapidly or with different speeds during different major load applications the testing operation will be subject to error. To provide for a slow and uniform rate of fall of the weights 8 there is provided a dashpot cylinder 18 having extended therefrom a piston rod 17. The upper end of piston rod 17 is linked to bell crank 13 by means of a link 16. A manually actuated valve 19 is provided on cylinder 18 to control the rate at which piston rod 17 descends into the cylinder. During application of the major load rod 21 will, as stated previously, gravitate downwardly into pocket 24 in cam 22. Downward movement of rod 21 will cause rod 17 to move into cylinder 18. The speed of rod 17 will be so controlled by the position of valve 19 that during the greater portion of the downward movement of rod 21, roller 12 will be engaged with plate 11. The fall of the weights will thereby be slow and uniform for all major load applications.

After the major load has been applied and before the hardness reading is taken from dial 26, it is desirable that the major load be removed from the penetrator. In the present embodiment removal of the major load is accomplished by means of a constant speed electric-motor 32. The shaft for motor 32 is provided with a bevel gear 33 which meshes with a series of teeth formed on a disk 34. Disk 34 and cam 22 are both keyed on the same shaft 23 so that rotation of gear 33 by motor 32 causes rotation of both disk 34 and cam 22. As cam 22 rotates in a counterclockwise direction (after completion of the major load application) cam portion 35 will ride into engagement with roller 32. Cam portion 35 is of changing radial thickness (as measured from the axis of shaft 23) so that continued rotation of cam 22 will cause rod 21 and bell crank 13 to be elevated toward their illustrated positions. When point 36 on cam 22 reaches roller 32, rod 21 and crank 13 will be in their illustrated positions and the major load will have been removed from penetrator member 3.

As was stated previously, it is desirable to maintain the motor motionless during application of the major load to the penetrator. There are therefore provided a series of switches for automatically putting the motor out of operation during the load application period. One switch, numbered 37 in the drawings, is immovably mounted in the housing adjacent the periphery of disk 34. An actuating arm 38 for switch 37 is provided with a roller 39 which rides along the periphery of disk 34. Two projections 40 and 41 are provided on the disk. Normally the circuit through switch 37 is open, but when roller 39 engages projection 40 or 41 the circuit through switch 37 is closed.

Directly behind disk 34 and keyed to shaft 23 is another disk 42, and directly behind switch 37 is another switch 43. Disk 42 is provided with two projections 44 and 45 which are in registry with the actuating arm 113 for switch 43. Normally the circuit through switch 43 is open, but when the actuating arm for switch 43 engages projections 44 or 45 the circuit through switch 43 is closed.

Another switch 46 is fixedly mounted adjacent rod 21. Normally the circuit through switch 46 is open, but when rod 21 gravitates into pocket 24 a projection 47 on the rod strikes the actuating arm and thereby causes the circuit through switch 46 to be closed.

To initially put motor 32 into motion there is provided a depressible trip plate 48 pivotally mounted on housing 1 by means of a pin 49. The lower face of plate 48 engages the actuating button of a switch 50.

With no current flowing through motor 32 and preparatory to the hardness testing operation the various switches will be in the positions shown diagrammatically in Figure 2 and cam 22 will be displaced approximately twenty radial degrees in a clockwise direction from the position shown in Figure 1. It will be observed that switch 37 controls current to the coils of a relay 51, switch 43 controls current to a relay 52, and switches 46 and 50 control current to a relay 53.

When it is desired to apply the major load to penetrator member 3, switch 50 is closed. This brings in current from the source 56, through lines 54, 55, 57, switch 50, lines 58, 59, 60, the coils of relay 53, line 61, arm 62, line 63, arm 64, lines 65, 66, 67, arm 68, lines 69, 70, 71 and out to ground 72. Flow of current through the coils of relay 53 causes arms 73 and 74 to close their contacts, and arm 75 to open its contacts. Current therefore flows from source 56 through lines 54, 76, the field circuit of motor 32, lines 77, 78, 79, arm 74, lines 80, 81, the armature of motor 32, lines 82, 71 and out to ground 72. The energization of motor 32 which is thereby effected causes cam 22 to rotate counterclockwise. Switch 50 need only be depressed momentarily to maintain relay 53 energized since once relay 53 is energized current from line 55 can flow through line 83, arm 73, lines 84, 85, 60 and into the coils of relay 53.

Counterclockwise rotation of cam 22 is continued at a uniform rate until projection 41 on disk 34 strikes roller 39. Current then flows from source 56 through lines 54, 86, relay 51, lines 87, 88, arm 37, lines 89, 67, arm 68, lines 69, 70, 71 and out to ground 72. Relay 53 is no longer energized because arm 64 has been moved (by energization of relay 51) to open its contacts. Current to the motor armature will be cut off but current will flow from source 56, through lines 54, 76, the field of motor 32, lines 77, 90, arm 91, lines 92, 66, 67, arm 68, lines 69, 70, 71 to ground 72. Cutting off current to the motor armature will slow the motor down, but the current which is fed to the field will allow motor 32 to operate at a reduced speed.

It will be noted that projection 41 does not maintain its contact with roller 39 during this entire period of reduced motor speed. However the circuit through relay coil 51 is not cut off because initial energization of the coil causes switch arm 110 to complete a circuit from line 111 to line 112. Thus, switch arm 110 serves as an alternate conduit for current from line 87 to line 67 after projection 41 has passed roller 39.

When projection 45 contacts the actuating arm 93 of switch 43 arm 68 will open its contacts and thereby cut the current flow through the motor field. The motor will thereby be stopped with projection 45 in position slightly to the left of shaft 23. By cutting current flow to the motor in two stages it is possible to more precisely control the stopped position of cam 22. The downward movement of rod 21 is relatively slow due to the retarding action of dashpot 18 so that by the time motor 32 has been stopped rod 21 will just be entering pocket 24 and application of the load to penetrator 3 will just be beginning. As rod 21 reaches the limit of its motion into pocket 24 projection 47 will strike the actuating arm for switch 46. Elements 47 and 46 are located so that when projection 47 strikes the switch arm penetrator 3 will have completed its penetrating movement into the work piece.

From the time when projection 45 strikes the actuator arm for switch 43 to the time when projection 47 strikes the actuator arm for switch 46 motor 32 will be motionless and no motor-caused vibrations will be set up in weight-carrying arm 7. When projection 47 strikes the actuator arm for switch 46 current will flow from source 56, through lines 54, 55, 57, 97, switch 46, line 94, arm 95 (to be described later), lines 96, 59, 60, relay 53, line 61, arm 62, line 63, arm 64, lines 65, 66, 67, arm 68, lines 69, 70, 71 to ground 72. Energization of relay 53 will cause current to flow through the motor field and armature in the same manner as when switch 50 was initially closed.

Motor 32 will thereby be automatically put into motion so as again to rotate cam 22 in a counterclockwise direction. As cam 22 rotates, cam surface 35 contacts roller 32 and causes rod 21 to be elevated. Elevation of rod 21 and current flow through motor 32 continues until projection 40 strikes roller 39, at which time current to the armature is cut off in the same manner as when projection 41 struck roller 39. Thereafter motor 32 moves at a reduced speed until projection 44 strikes arm 93, at which time motor 32 will be stopped in the same manner as when projection 45 struck arm 93. During the period when cam surface 35 strikes roller 32 until point 36 reaches roller 32 the weights 8 will be caused to move upwardly. This period may be considered the load removal period.

After the load is removed and the motor is stopped the hardness may be recorded from dial 26.

The complete sequence of operations involved in a hardness measurement includes placing the work piece on support member 2, manually turning handles 5 to raise member 2 and impress the minor load on penetrator member 3, manually turning pulley 31 to rotate casing 26 to zero pointer deflection, and manually pressing down on plate 48. Depression of plate 48 causes motor 32 to (1) run at full speed until projection 41 strikes roller 39, (2) thereafter run at reduced speed until projection 45 strikes arm 93, (3) thereafter remain motionless until application of the major load is completed and projection 47 strikes the actuating arm of switch 46, (4) thereafter run at full speed until removal of the major load is completed and projection 40 strikes roller 39, and (5) thereafter run at reduced speed until projection 44 strikes arm 93, at which time motor 32 will be stopped. The sequence of operations is completed by recording the hardness measurement from dial 26.

It should be noted that with the illustrated mechanism the speed at which the major load is applied to penetrator 3 is governed only by dashpot 18 and not by the speed of motor 32 (the motor is motionless during application of the major load). It is therefore possible to employ a relatively high speed motor so as to effect major load removal in a minimum time period. The time for completing the full sequence of operations will thereby be materially shortened.

Another factor which governs the speed of the hardness measurement is the relative position of switch 46 and projection 47. It is desirable for quick effectuation of the measuring process that the projection on rod 21 strike the switch arm as soon as possible after complete penetration of member 3 into the work piece. With soft work pieces member 3 completes its penetrating movement rather quickly but with harder work pieces the penetrator movement takes a longer period of time. It is advantageous therefore to provide means for varying the time at which the motor-energizing switch is actuated in accordance with the time required for full penetration of member 3. This means, in the illustrated embodiment, includes a switch 99, a projection 98, and a switch 95. Switch 95 may be thrown so as to put either switch 46 or switch 99 into line with relay 53. With soft work pieces the necessary downward travel of rod 21 will be short and switch 46 will be put into line with relay 53. With harder work pieces the necessary travel of rod 21 will be longer and switch 99 will be put into line with relay 53. Switch 95 will of course be thrown into the desired position preparatory to start of the hardness measuring operation.

It is possible that through some inadvertence motor 32 may be disconnected from its source of power (as by someone pulling the motor's plug from its socket) with one of projections 40, 41, or 44, 45 in engagement with roller 39 or arm 93. In such event it would be impossible to re-energize the motor even by cutting in the power source because either arm 64 or arm 68 would break the circuit through motor-energizing relay 53. Means is therefore provided to guard against such a possibility. This means includes a switch 100 which is normally open. In the event of power disconnection, however, switch 100 may, on restoration of the connection, be manually closed. Current will then flow from source 56 through lines 54, 76, the motor field, lines 77, 78, 101, switch 100, lines 102, 81, the motor armature, lines 82, 71 and out to ground 72. The motor will thereby be energized.

In normal operation of the mechanism trip plate 48 for switch 50 is only momentarily depressed to permit initial energization of coil 53. When the initial energization has been completed arm 73 thereafter supplies current for coil 53. However if the operator should mistakenly hold trip plate 48 in the depressed position until after projection 45 has passed to the left of arm 93 the motor would continue to operate at a time when it should be stopped. Therefore a coil 52 is provided for automatically deenergizing coil 53. In operation, if switch 50 is closed when projection 45 strikes arm 93, arm 113 will allow current from line 84 to travel through line 114, coil 52, lines 115 and 116, arm 113, and lines 117, 70 and 71 to ground 72. Coil 52 is thereby energized to cause arm 62 to break the circuit through coil 53. After projection 45 passes beyond arm 93 the circuit through coil 52 is continued through line 118, arm 119, and line 120 to give a further degree of projection.

Having thus described my invention, I claim:

1. A hardness testing machine comprising a work-supporting member, a penetrator member, means for applying a load to and removing a load from one of said members, said means including a load-carrying arm, motor means for moving said arm in one direction to effect removal of the load and permitting it to move in the opposite direction to effect application of the load, a rod between said arm and motor means for translating movement of the motor means into load-removal movement of the arm, a rotary cam between said rod and motor means, said cam having a rod-engaging portion of changing radial thickness for moving the rod means during load-removal movement and having a pocket portion of lesser radial thickness than the aforesaid portion for permitting movement of the rod free of the cam during load application, first switch means actuated at entrance of the rod into the pocket portion for automatically switching off the motor means, and second switch means actuated by a predetermined movement of the rod into the pocket portion for automatically switching on the motor means so as to energize it for effecting the load removal operation.

2. The combination of claim 1 and further including dashpot means for controlling the rod's rate of load-removal movement.

3. The combination of claim 1 wherein the leading portion of the pocket is formed by a surface of the cam extending acutely from the rod-engaging portion; whereby the cam is insured against contact with the rod during the entire load application period.

4. The combination of claim 1 wherein the leading portion of the pocket is formed by a surface of the cam extending in a substantially radial direction from the rod-engaging portion; whereby the cam is insured against contact with the rod during the entire load application period.

5. The combination of claim 1 wherein the first switching means includes a disk driven in timed relation to the cam and an electric switch having an actuator positioned adjacent the disk periphery; said disk having a uniform radius at substantially all points around its periphery; said disk however having at least one minor area of different radius for causing a movement of the actuator so as to switch off the motor means.

6. The combination of claim 1 wherein the motor means comprises a multi-speed electric motor; the combination further comprising third switch means separate from the second switch means for running the motor at reduced speed; said second switch means operating the motor at full speed; fourth switch means for automatically stopping the motor when the load is in a removed position; and mechanism driven in timed relation to the motor so as to actuate the third switch means after completion of the load-removal operation and prior to actuation of the fourth switch means, whereby the motor is running at reduced speed at actuation of the fourth switch means and the cam is insured to stop before its pocket reaches the rod.

7. A hardness testing machine comprising a work-supporting member, a penetrator member, means for applying a load to and removing a load from one of said members, said means including a load-carrying arm, motor means for moving said arm in one direction to effect removal of the load and permitting it to move in the opposite direction to effect application of the load, a rod between said arm and motor means for translating movement of the motor means into load-removal movement of the arm, a movable cam between said rod and motor means, said cam having a rod-engaging portion of changing thickness in a direction at right angles to its direction of movement whereby to move the rod means during load-removal movement; said cam having a pocket portion of lesser thickness than the aforesaid portion for permitting movement of the rod free of the cam during load application, first switch means actuated at entrance of the rod into the pocket portion for automatically switching off the motor means, and second switch means actuated by a predetermined movement of the rod into the pocket portion for automatically switching on the motor means so as to energize it for effecting the load removal operation.

8. The combination of claim 7 wherein the second switching means includes an electric switch having an actuator positioned adjacent the rod; one minor portion of the rod being of different radial thickness than the remaining portions; whereby when said one rod portion engages said actuator the motor means will be energized.

9. The combination of claim 7 wherein the second switching means includes two electric switches having actuators positioned at different points; there being manually actuable switch means for alternately putting each of the two electric switches into the motor means circuit; whereby the extent of the rod's predetermined movement into the pocket portion is varied in accordance with the position of the manually actuable switch means.

10. The combination of claim 7 wherein the motor means comprises a multi-speed electric motor; the combination further comprising third switch means separate from the second switch means for running the motor at reduced speed; said second switch means operating the motor at full speed; fourth switch means for automatically stopping the motor when the load is in a removed position; and mechanism driven in timed relation to the motor so as to actuate the third switch means after completion of the load-removal operation and prior to actuation of the fourth switch means, whereby the motor is running at reduced speed at actuation of the fourth switch means and the cam is insured to stop before its pocket reaches the rod.

11. A hardness testing machine comprising a work-supporting member; a penetrator member; means for applying a load to and removing a load from one of said members; said means including a load-carrying arm; a multi-speed motor for moving said arm in one direction to effect removal of the load and permitting it to move in the opposite direction to effect application of the load; a switch for initially operating the motor at full speed, a rod between said arm and motor for translating movement of the motor into load-removal movement of the arm, a rotary cam between said rod and motor, said cam having a rod-engaging portion of changing radial thickness for moving the rod means during load-removal movement and having a pocket portion of lesser radial thickness than the aforesaid portion for permitting movement of the rod free of the cam during load application, a second switch actuated at entrance of the rod into the pocket portion for automatically switching off the motor, a third switch actuated by a predetermined movement of the rod into the pocket portion for automatically switching on the motor means so as to energize it for effecting the load removal operation, rotary disk means driven in timed relation to the cam; and switch mechanism having actuator structure positioned adjacent the disk means periphery; said rotary disk means and switch mechanism cooperating with the first, second and third switches for sequentially (1) operating the motor at full speed until the pocket portion reaches the rod, (2) operating the motor at reduced speed until the rod enters the pocket, (3) holding the motor motionless until after the rod has had its predetermined movement into the pocket, (4) operating the motor at full speed until the load is in its removed position, and (5) operating the motor at reduced speed until the cam reaches its initial position.

References Cited in the file of this patent

UNITED STATES PATENTS

| | | |
|---|---|---|
| 1,646,195 | German | Oct. 18, 1927 |
| 2,217,388 | Smith | Oct. 8, 1940 |
| 2,418,916 | Weaver | Apr. 15, 1947 |
| 2,640,591 | Sieggreen | June 2, 1953 |